June 11, 1940.    H. D. SANDSTONE    2,203,747
LAMINATED DISK DRILL BIT
Filed Sept. 20, 1937
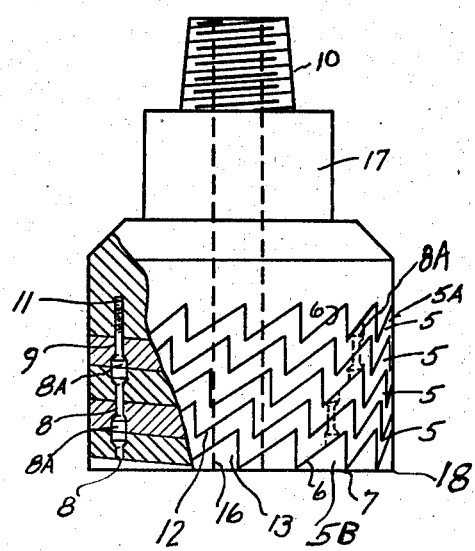
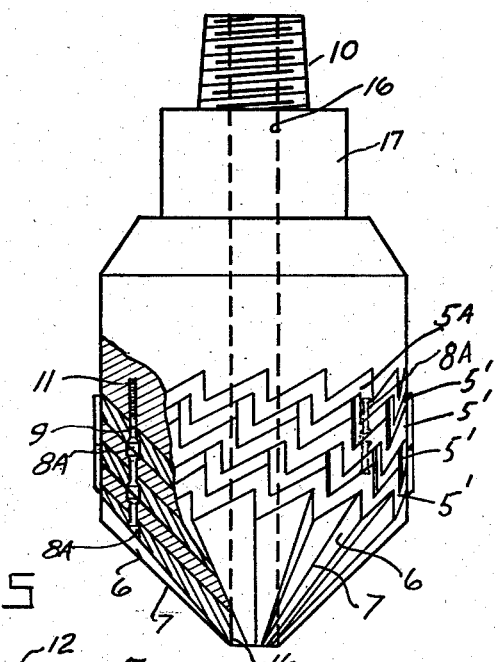
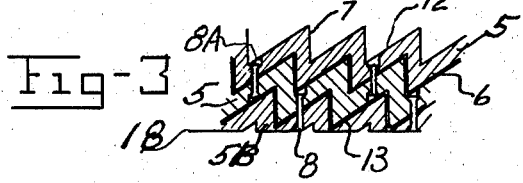
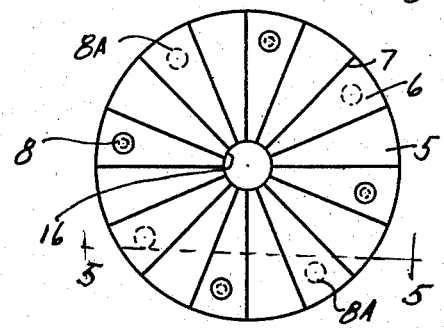
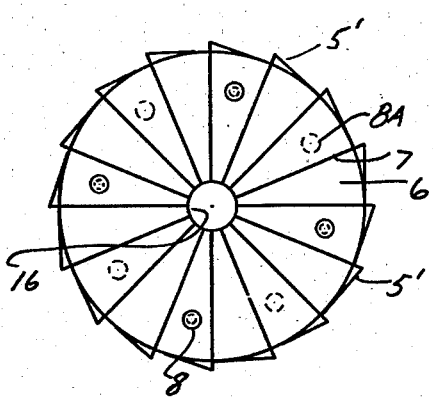
INVENTOR.
Harral Sandstone Patented June 11, 1940

2,203,747

UNITED STATES PATENT OFFICE 2,203,747

LAMINATED DISK DRILL BIT

Harvey D. Sandstone, Los Angeles, Calif.

Application September 20, 1937, Serial No. 164,707

3 Claims. (Cl. 255—61)

This invention relates to a drilling or rock boring device and is particularly, though not exclusively, adapted for deep well drilling.

Another important object of the invention is to provide a rotary drilling bit of the character mentioned by which drilling operations may be expeditiously performed and by which one drilling tool may have the cutting capacity of many tools of the single cutting face type.

Another object of the invention is to provide a simple and effective means by which the worn and loosened cutting face units may be easily removed therefrom as the drilling progresses.

A further object of the invention is to provide a generally improved drilling bit of the character mentioned which is strong, durable, economic in operation and reliable in use.

Another object of advantage, is to provide a cutting unit built up with a number of cutting units adapted to be released individually and replaced by the next layer of new and sharp cutters.

Other objects and advantages of the invention will become apparent from the following description taken in connection with the accompanying drawing in which, Figure 1 is an elevation view showing the drill with a flat cutting face and having a broken sectional view of the cutting disks with their fastenings;

Figure 2 is an elevation view showing a modification of the drill with a conical shaped cutting face and having a broken, sectional view of the cutting units with their fastenings;

Figure 3 is a bottom plan view of Figure 1;

Figure 4 is a bottom plan view of Figure 2;

Figure 5 is a fragmentary sectional view taken on line 5—5 of Figure 3 and showing the disk construction with its fastenings 8 and notched openings 8A, and a bottom disk with worn sections 5B and a line 18 indicating the point of disk disintegration.

Referring to drawing, a series of cutting disks 5 are fixed one on top of the other. Each disk is provided on their upper and lower faces with cutting teeth 6, which have sharp edges 7. As the disks are stacked one on top of another, the teeth of the intermediate disks fit between the teeth of the next adjacent disks to transmit the driving torque from the drill body 17 to the bottom cutting disk. These disks are held together by soft metal rivets or suitable fastenings 8 which extend nearly to the cutting edges of the teeth 6. The soft metal bolts 9, are threaded at their ends 11 to fasten the uppermost disk to the drill body or shank 17. Notched openings 8A are provided in the disks to permit fastenings 8 to enter and form the suitable connection between the disks. The drill body has a standard tapering tool joint pin 10 on its upper end. The channel between the teeth on the upper face of the disk is represented by numeral 12 and the channel between the teeth on the lower face is represented by the numeral 13 in Figures 1 and 5.

In operation, the drill bit is connected to a rotary drill stem by a threaded connection and rotated by a rotary drill table which is well-known in the well drilling art. During the rotating operation, the cutting edges 7 become worn down to line 18 as shown in Figure 5 with the fastenings 8 in the teeth cut off to allow the lower or cutting disk to disintergrate and the next disk to come into play as a cutting disk. This action is repeated until all the disks are dissipated and the bit runs on the smoothed master cutter 5A or the thick shank protecting disk to notify the drill operator to pull the drill string.

When the sharp cutting edges 7 on the teeth 6 become dull, the wearing process has already begun on the soft rivet heads 8 which hold this particular bottom cutting disk in position. As the teeth 6 become worn down to the pre-determined point or line 18 as shown in Figure 5, channel 12 meets channel 13 and this lower disk disintegrates and leaves small portions 5B of the lower disk projecting between the teeth of the adjoining disk 5. These small portions are nicked or dented on their ridges to become weakened and then to break up into very small particles after the soft rivets or fastenings 8 have lost their heads. The fragments which remain slip off into the hole and become subject to the cutting action and pressure of the cutting disk which was next to and engaging the above disintegrated disk. This process is repeated until the hole is completed or the stack of interlocking cutting disks are depleted. The small fragments of metal remaining in the hole will be removed by the present system of heavy circulating mud to the top of the bore hole, or crowded into the walls of the well. Figure 4, some cutting disks are provided on their outer sides with reaming edges 5' which will enlarge a hole that is too tight or cut away foreign matter which might be lodged on one side of the well wall.

During the rotating operation, the tooth cutting edges 7 become worn down to line 18 as shown in Figs. 1 and 5, cutting off the fastenings 8 on the teeth 6, allowing the lower or cutting disk to disintegrate and the next cutting disk above to come into play. This action is repeated until all cutting disks are dissipated and the bit runs on the smoothed master cutter 5A or the thick shank protecting disk, notifying the drill operator to pull the tool.

While only one form of the invention has been herein shown and described, it will be understood that various modifications and changes may be resorted to without departing from the spirit of the invention or the scope of the following claims.

What is claimed is:

1. A boring device, provided with a body to which a plurality of cutting elements are separately and individually detachably mounted, said elements being positioned to form a stack with one element on top of another, said elements being ridged and grooved on both sides for the purpose of forming cutting edges as well as securing them interlockingly together; fastening means associated therewith, said fastening means adapted to release the bottom cutting element of the stack when the abrasive action of the well formation destroys the fastening means and allows the worn particles of the bottom cutting element to be discarded for the next cutting element above.

2. A drilling tool organization comprising; stack of interlocking cutting members; fastenir means provided with suitable elements associate therewith, said elements adapted to secure fasten one cutting member to the next adjacer member; grooves and ridges provided on bot sides of the above mentioned members, formir cutting units on the lower or cutting face thereo these cutting units being provided with notch for accommodating the projecting ends of th elements mounted correspondingly on the cu ting units of the adjacent members.

3. A boring bit having a body portion, threaded upper end, a series of interlocking cu ting elements detachably mounted to the othe end thereof; said cutting elements havin crimped grooves and ridges on their upper an lower sides forming cutting units on their unde sides and interlocking means on the upper side of said cutting elements and disposed toward th outer edge of the aforesaid cutting units are pro jecting portions to accommodate the correspond ing openings in the adjacent cutting elemen forming the fastening means thereof.

HARVEY D. SANDSTONE.